United States Patent Office 3,514,423
Patented May 26, 1970

3,514,423
TREAD END CEMENT FOR SYNTHETIC TIRE TREADS
Emmett B. Reinbold, Cuyahoga Falls, Ohio, assignor to The General Tire & Rubber Company, a corporation of Ohio
No Drawing. Continuation-in-part of application Ser. No. 412,225, Nov. 18, 1964. This application May 3, 1968, Ser. No. 726,596
Int. Cl. B29h 17/02; C08d 11/02
U.S. Cl. 260—33.6                                   1 Claim

ABSTRACT OF THE DISCLOSURE

A cement useful with synthetic treads comprises 100 parts by weight of a rubbery polymer composed primarily of SBR having a computed Mooney viscosity of between 120 and 180 and up to about 30 parts of a low Mooney cis-polybutadiene, 0 to 15 parts of a hydrocarbon plasticizer oil, about 30 to 120 parts of a relatively fine abrasion furnace black, and about 65 to 135 parts of a tackifier comprising a resinous condensation product having a melting point between 230° and 265° F. Because of the relatively large amount of tackifier that is employed, a novel two-step process is used to prepare the cement.

CROSS REFERENCE TO RELATED APPLICATION

This is a continuation-in-part of U.S. patent application S.N. 412,225, filed on No. 18, 1964 now U.S. Pat. 3,421,565 said application in turn being a continuation-in-part of application S.N. 277,712 filed May 3, 1963 by the inventor hereof and now abandoned.

BACKGROUND OF THE INVENTION

For many years, natural rubber adhesives were considered superior to most known synthetic adhesives in the manufacture of tires, including tires made out of synthetic rubber such as SBR (styrene-butadiene rubber). More recently, synthetic rubber tire adhesives have been discovered which produce tires at least equal to those having the rubber portions adhered with natural rubber adhesives. Such synthetic adhesives are known in the art, for example, as disclosed in U.S. Pat. No. 3,342,238, owned by the assignee of the present invention. In this patent, it was proposed to use, in a rubber tread cement, together with 100 parts by weight of a cold SBR-type copolymer, at least about 20 parts of Koresin melting at 245° to 250° F. and about 20 up to 50 parts of oil together with 40 to 100 parts of HAF carbon black (i.e., of 70 to 80 square meters per gram surface area, supra). Koresin is the tradename of a resinous condensation product of acetylene and tertiary butyl phenol. This cement is satisfactory in four ply passenger tires, but is not totally reliable in 2 ply tires where greater deflection normally occurs.

It is also known in forming certain adhesives to add to 100 parts by weight of cold SBR-type copolymers, 30 to 50 parts of the resin 2,6-dimethylol-4-octyl phenol-formaldehyde (i.e. Amberol S.T.–137X) together with 30 to 70 parts of the HAF (High Abrasion Furnace) carbon black such as "Philblack O" or Vulcan 3 having, respectively, a surface area of about 70 and about 80 square meters per gram. The surface area of HAF carbon blacks in general are given in the Vanderbilt Handbook, Eighth Edition as being between about 74 and 98 square meters per gram.

Furthermore, adhesives for medical bandages are known which comprise 100 parts by weight of a semi-cold rubbery SBR-type copolymer having a low Mooney viscosity of 30 to 100 with 50 to 150 parts of such tackifying resinous materials as rosin, hydrogenated rosin or esters of rosinous materials, 10 to 150 parts by weight of a plasticizer such as white mineral oil, 1 to 300 parts by weight of a filler such as clay or SRF (Semi Reinforcing Furnace) carbon black, together with 4 parts by weight of total curing agents. Before use, the resulting composition is pre-cured at temperatures of 200° to 250° F. in the present of added solvents, or at temperatures of about 300° F. in the absence of added solvents. The adhesive just described is not practical as a tread cement for oil-extended cold SBR-type rubber because the Mooney viscosity of the SBR-copolymer in the adhesive is unduly low, the resinous tackifying materials are not at all suitable, and the types of fillers are not appropriate.

It has been further proposed to adhere synthetic rubber tire treads, other than SBR rubber treads, to an SBR-type carcass using an adhesive containing Neoprene rubber (i.e. polymerized 2-chloro-butadiene-1,3 rubber) alone or admixed with a synthetic rubber other than an SBR rubber. In this case, a titanium dioxide pigment is used together with 0.5 to 10.0 parts by weight of such tackifying materials as hard cumar, rosin, coal-tar or pitch. Such rubber cements are not suitable for the adhesion of cold SBR-type copolymer treads to the carcass portion of synethetic SBR-type tires.

Partially vulcanized butyl rubber (i.e., multi-olefin-isoolefin copolymers) together with 2,6 - dimethylol-4-octyl phenol-formaldehyde resins, have also been suggested as tire tread adhesives. However, these adhesives have not been found useful for the purposes of the invention due to the fact that butyl rubber requires different acceleration than does SBR-type rubbery copolymers. The foregoing resin is also unsatisfactory.

Rubbery copolymers of butadiene and acrylonitrile, which have been compounded with rosin or coal tar, have also been suggested as tread adhesives. However, such adhesives have been found unsatisfactory because of the inoperability of rosin or coal tar as tackifying materials in tread cements.

An object of the invention is to provide an improved tire tread cement which facilitates the production of high quality synthetic rubber tires, including two ply tires.

Another object of the invention is to provide such a cement through the judicious selection of ingredients including the carbon black and tackifier and an improved process for preparing the cement.

Other objects and advantages of the invention will become apparent to those skilled in the art from the following description and claims.

DETAILED DESCRIPTION OF THE INVENTION

It has now been discovered that the quality of certain tire splices is greatly improved by reducing the amount of oil or even eliminating the oil in a high Mooney diene rubbery hydrocarbon polymer adhesive composition, by adding certain critical amounts of specific types of resinous condensation products of alkines and alkylphenols such as Koresin, preferably before any carbon black is added, by employing certain types of carbon black, and by adding additional amounts of the resinous condensation products after certain of the ingredients of the rubber composition, preferably including curing agents, have been incorporated into the solid rubber at certain temperatures and after such rubber composition subsequently has been cooled and then dispersed in an organic solvent.

The rubber hydrocarbons of the adhesive composition of this invention preferably comprise rubbery polymerization products of a conjugated diolefin such as isoprene and/or butadiene-1,3; preferably members of the group consisting of polybutadiene and especially copolymers of butadiene with vinylaryl compounds, such as styrene, said polymerization products having computed Mooney viscosities of 120 to 180, preferably 120 to 160. The butadiene styrene (SBR) copolymers used in the cement of the present invention generally contain 60 to 85% by weight of butadiene and 40 to 15% by weight of styrene. Also, the rubber adhesive composition of this invention may contain 0 to 30 parts, per 100 parts by weight of total rubber hydrocarbons, of elastic polybutadiene rubber with an apparent raw Mooney viscosity of about 35 to 65, usually more than 30% and preferably at least 60% of the polybutadiene rubber has the cis-1,4 structure, although 90 or 95% cis-1,4-polybutadiene is even more desirable for the purposes of the present invention. Processes for preparing suitable polybutadiene rubbers are well known in the art and such rubbers are available commercially. Some of these processes are discussed in the article on pages 361 to 377, Rubber Chemistry and Technology, Vol. XXXIV, No. 2, April–June 1961 and page 643, McGraw-Hill Encyclopedia of Science & Technology, Vol. XI, 1960 edition.

The adhesive composition of this invention employs a furnace carbon black having an average surface area of from 100 up to 170, preferably from 110 to about 150 or 160, square meters per gram, and a pH in the range of between about 5 and 10. Within this definition, a furnace carbon black such as ISAF (Intermediate Super Abrasion Furnace) carbon black having an average surface area of about 110 or 115 to 135 or 140 square meters per gram may be used as the sole carbon black.

Alternatively, blends of preferably minor proportions of HAF carbon blacks having particle sizes between about 74 and 98 square meters per gram together with a major proportion of SAF (Super Abrasion Furnace) carbon black having a surface area of between about 140 to 160, preferably about 140 to 150 square meters per gram may be used. Also, mixtures of preferably a minor proportion of SAF carbon blacks with a major proportion and preferably at least two-thirds of ISAF carbon blacks are useful for the purposes of the present invention, as are mixtures of about 70 to 100% ISAF carbon blacks together with about up to 30% HAF carbon blacks.

The blend of carbon blacks should have an average surface area of above 100 up to 160 or 170 square meters per gram and preferably 110 to 140 square meters per gram. Blends of all three of the abrasion furnace carbon blacks just mentioned are operable and useful in accordance with the present invention as long as the average surface area of the blend is about 110 to 160 square meters per gram. It is, however, preferable to utilize either all ISAF carbon blacks having an average surface area in square meters per gram of about 115 to 140 or a major proportion of such ISAF carbon blacks together with minor proportions of HAF carbon blacks of 74 to 98 square meters per gram and the SAF carbon blacks with the surface areas hereinbefore mentioned providing the blend has an average surface area of about 110 to 150 square meters per gram.

It should be noted that although SRF (Semi Reinforcing Furnace) carbon black has a basic pH, the surface area of CRF carbon black is only between about 15 and 20 square meters per gram (Whitby text, supra, page 400) thus rendering SRF carbon black inoperative for the purposes of the present invention. In a like manner, the furnace carbon black Statex-A, haping a low surface area of about 60 to 65 square meters per gram, is also unsuitable for use in accordance with the present invention.

Further, the carbon black MAF (Medium-Abrasion-Furnace) carbon black is unsuitable for the purposes of the invention in that the surface area is too small, namely about 35 to 60 square meters per gram.

The upper limit of surface area of carbon black is also critical. Thus, the carbon black known as CC (conductive channel- carbon black is unsuitable for use in cements of the invention apparently because the surface area is two times too high, i.e., 385 to 390 squire meters per gram. It is quite unexpected that doubling the surface area of the carbon black will produce inoperative results. However, the pH of conductive channel black is shown by G. S. Whitby to be 4.6 or acidic, which further eliminates this type of carbon black from consideration for use in the adhesives of the invention because of its retarding effect upon the curing of the cement.

The amount of carbon black used in the tread cement of the invention can range from 30 to 120 parts per 100 parts by weight of rubber hydrocarbons, although the generally preferred range is 45 to 80 parts.

The adhesive of the present invention, which surprisingly is self-adhering in nature, contains, per 100 parts of total rubber hydrocarbons, at least 65 and preferably at least 70 parts by weight of a tackifying resin, a major portion of which is a resin comprising a condensation product of a member of the acetylene series and a phenol substituted in the ortho or preferably in the para position with an aliphatic hydrocarbon group. The preferred tackifying resin is "Koresin" which is the condensation product of acetylene and p-tertiary butyl phenol. Other resinous condensation products of acetylene compounds and phenols substituted in the para position with an alkyl group having 3 to 6 or 8 carbon atoms can also be used. In general, such resins necessarily comprise at least a major proportion, preferably about 75 to 100% by weight of total resins in the cement and even more especially about 85 or 95 to 100% by weight of the total resins.

Approximately half (e.g., 30 to 70%) of the above resin is initially blended with the cold SBR-type rubber in the substantial absence of solvents at a temperature at least sufficient to soften or melt the resin, the remainder of the resin being added in solution from and/or to a solution of the compounded cold rubber at a later stage in manufacturing the tread cement. Inasmuch as such resins melt at between 230° and 265° F., as disclosed in German Pats. 422,904 and 523,993 and French Pat. 758,042 to the I. G. Farben Co., an advantageous temperature range for mixing the first half, of the above-defined resin, depending upon the melting point of the resin, is about 230° to 350° F., preferably about 250° to 330° F., and even more especially, about 270° to 320° F.

According to the German patents just mentioned, the resins which have now been found to be suitable for use in the tread cement of the present invention may be produced at reaction temperatures of between about 100° and 300° C. at atmospheric presure, although pressures of 5 to 10 atmospheres under nitrogen are preferred. The acetylene material is caused to react with the modified phenol to produce the desirable resin by means of catalysts such a combination of sulfuric acid and mercuric sulfate, sulfuric acid-mercuric sulfate-ferric chloride, or mercuric oxide sulfuric acid, preferably impregnated on a carrier or support such as kieselguhr, activated charcoal, or the like. Alternatively, the reaction may be promoted by such catalysts as zinc and/or cadmium salts of acetic acid or other relatively low molecular weight monocarboxylic acids, with or without the addition of a minor proportion of sulfuric acid.

Alternative methods of producing the resin condensation products of ortho substituted or preferably para substituted alkyl phenols with acetylene compounds for use in the present invention, involve polymerization in the presence of catalysts comprising at least one Group IIb metal, Group IIb metal oxide, Group IIb metal nitrate, and/or Group IIb metal $C_2$ to $C_{10}$ monocarboxylic such as zinc, cadmium and/or especially mercury used per se or in compound-form. Also Groups IIIa, IVb, VIb, and/or especially Group VIII metal catalysts, optionally supported on refractory materials of high surface area such as, for example, eta-alumina, bentonite, activated charcoal, etc., are generally operative in many instances for promoting such condensation polymerization reactions. It is, however, desirable to use at least a minor proportion of the Group IIb metals or Group IIb metal compounds together with such latter metal catalysts. Best results are obtained when polymerization takes place at an elevated temperature of at least about 80° C. under a pressure generally approximating at least about 1.5 atmospheres absolute or higher.

The polymerization reactants to produce the substituted phenol-alkine resins, include as alkines, such monomeric materials as dimethyl acetylene, hexyl acetylene, methylalyene, alylene, and/or preferaby acetylene. The hydrocarbon substituted phenols useful as polymerizable comonomers advantageously contain a $C_3$ to $C_{10}$ alkyl groups, preferably a $C_3$ to $C_6$ tertiaryalkyl group, and may, for example, comprise such compounds as para-tertiarybutyl phenol, ortho-tertiary pentylphenol, para-tertiary amylphenol, para-propylphenol, para-isopropylphenol, para-hexylphenol, etc. Such resins are normally soluble in various rubber solvents such as hexane, naphtha, mineral spirits, gasoline or rubber-maker's solvent, which may be used in the process of this invention. A non-polar solvent is preferred. The tackifying resins used in the cement compositions of this invention are compatible with the butadiene-styrene copolymer, or in other words, comprise resins which are capable of being milled into the polymer to form a rubber composition which is homogeneous when vulcanized to the elastic state.

The cement composition of this invention, if desired, may optionally contain small amounts of plasticizer oils, as will be more fully described hereinafter. The plasticizer oil, if used in the adhesive composition of the invention, may be the same as those disclosed in columns 9 to 12 of U.S. 2,964,083 owned by the assignee of the present invention. Such plasticizer oils include, among others, hydrocarbon mineral oils boiling above 450° F. and containing aromatic, naphthenic and paraffinic hydrocarbons. Such plasticizer oils generally are petroleum oils having strong solvent power, high boiling points and low vapor pressures. Typical plasticizer oils, which may be used alone or in admixture, include:

(a) Sundex 53, a dark aromatic and naphthenic hydrocarbon lubricating oil extract consisting of three-fourths aromatic hydrocarbons and one-fourth naphthenic hydrocarbons as determined by the Clay-Gel method.

(b) Circosol 2XH, a light green viscous hydrocarbon liquid having a specific gravity of 0.95, a Saybolt viscosity at 100° F. of 200 seconds and 210° F. of 83 seconds. Such oil contains 20% aromatic hydrocarbons, 39% naphthenic hydrocarbons and 41% paraffinic hydrocarbons, as determined by measuring its viscosity, specific gravity and refractive index. It has a pour point of 10° F., a flash point of 540° F., and an aniline point of 174° F.

(c) Philrich 5, a liquid containing 41% aromatic hydrocarbons, 20% naphthenic hydrocarbons and 39% paraffinic hydrocarbons. It is a blend of extract oils produced during solvent extraction of lubricating oils.

Various other compounding ingredients which are used in certain SBR stocks may be employed in the cement of this invention including "BLE," "Santocure," "Santoflex AW," etc. "BLE" is a high temperature reaction product of diphenylamine and acetone and is used as an antioxidant as is "Santoflex AW" which is 6-ethoxy-1, 2-dihydro-2, 4-trimethyl quinoline. "Santocure" is N-cyclohexyl-2-benzothiazole sulfenamide, an accelerator.

In preparing the cement of the present invention, the synthetic rubber hydrocarbons, the carbon black and various other compounding ingredients, such as zinc oxide and an antioxidant, are added to a Banbury after substantial amounts of the tackifying resin have been incorporated into the rubber. Thus, 100 parts by weight of a diene rubber polymer having a computed Mooney viscosity of from 120 to 180 are added to the Banbury. The aforementioned amounts of alkylphenol-alkine resinous condensation products, such as Koresin or the like are then added. After this has been thoroughly incorporated, from 40 to 110 parts of the carbon black, 0 to 15 parts of oil, and certain other compounding ingredients are then added.

When the compounding ingredients are incorporated into a rubber on a mill or Banbury degradation of the rubbery polymer necessarily occurs. In the practice of the present invention it is important that most of long molecular structure of the High Mooney (120 to 180 ML-4 at 212° F.) rubber be retained in the final cement. The degradation is kept at a minimum both by incorporation of a substantial part of the resin in the softened or melted state where it lubricates the molecules of polymer and allows a minimum mixing time and temperature, by subsequently adding substantial amounts of an organic solvent which dissolves both the resin as well as the high Mooney cold SBR-type rubber and/or by adding the remainder of the resin in dissolved form. At least 20 parts, and preferably at least 30 or 40 parts, of the resin per 100 parts by weight of rubber hydrocarbons, generally about one-third to two-thirds of the total amount of resins in the final cement composition, are dispersed at an elevated temperature in the rubber before substantial amounts, i.e., at least a major portion of the carbon black are added to the rubber. The amounts of tackifying resins added before the carbon black are sufficient that the compounded Mooney viscosity of the rubber stock facilitates the subsequent dispersion of carbon black in the rubber by conventional mastication at 230° to 350° F., at which temperatures the resins melt. If, in accordance with prior art procedures, all of the resin is added at this stage, the stock will be sticky and too difficult to handle. Various other compounding ingredients may be added with the carbon black, including 0 to 10, preferably 2 to 8 parts of zinc oxide, 0 to 2 parts of stearic acid, and 0 to 3 parts of an antioxidant per 100 parts by weight of rubber hydrocarbons.

The rubber is then cooled to around room temperature or at least to below 150° F., preferably by discharging it from the Banbury and allowing it to stand. Thereafter, the rubber composition may be mixed at temperatures not in excess of about 220° to 230° F. with curing agents, such as 1 to 3 parts of sulfur, 0.5 to 3 parts of accelerators and the like per 100 parts by weight of total rubber hydrocarbons. At this stage, the temperature is preferably maintained well below (preferably 30° to 50° F. below) the vulcanization temperature. Normally, the temperature is maintained at from room temperature up to a temperature of about 212° to 230° F. It has been found, however, that when using the tread cement compositions of the present invention, in many instances, the curing agents may be omitted, if desired. This composition is then dispersed in an organic solvent for the rubber, the balance of total resin then being added to provide a resin content of 65 to 125 (preferably 70 to 110) parts per 100 parts of rubber.

The amount of resin added to the resulting cement is at least 20 parts, advantageously at least 30 or 40 parts, per 100 of rubber, and is preferably one-third to two-thirds of total resin in the cement. Alternatively, 35% to 70 or 80% of the total resins may be added after the rubber is dissolved, such last resin portion preferably being dissolved in a solvent for the rubber before it is added to the cement.

Best results are obtained when the total rubber hydrocarbons have an average toughness such that a mixture consisting of 100 parts of such rubber hydrocarbons, 44 parts of hydrocarbon mineral oil, and 72 parts of HAF carbon black has a compounded Mooney viscosity of about 60 to 95, preferably about 60 to 80.

The adhesive of this invention is preferably used with conventional SBR rubber tread compositions to make pneumatic rubber tires by what is known as the "flat-band" process. The multiple-ply fabric tire carcass is formed on a cylindrical tire building drum, and the ends of the fabric are turned over the wire bead rings to complete the carcass. Then, an extruded rubber tread stock, preferably formed of a high Mooney SBR rubber composition, is wrapped around the carcass on the drum and adhered to the carcass.

Before the tread stock is applied to the carcass, the self-adhering cement composition is applied to both the bias-cut ends of the tread stock and, if desired, to the entire bottom surface of the tread stock and such cement is allowed to dry. Then the tread stock is applied to the carcass and spliced in the usual manner.

The "green" tire is then removed from the tire building drum and placed in a conventional mold or press where it is expanded from generally cylindrical shape to a generally toroidal form. The means for shaping the tire and the curing conditions are conventional. The adhesive layer between the ends of the tread stock at the tread splice is sufficiently strong to hold the tire together during this radial expansion and curing. When the tire so formed is vulcanized in such tire curing equipment and road tested at high speeds, no tread splice opening or tread separation occurs.

The measurement of the viscosity or plasticity of the high Mooney SBR-type rubber used in the cement composition of the present invention is described in the "United States Government Specifications for Synthetic Rubbers," July 1945, and "ASTM Standards on Rubber Products," December 1952, pages 488 to 491. The viscosity test using the Mooney plastometer has been given ASTM designation D–924–52T. The term "Mooney viscosity" as used in the present specification and claims designates the conventional reading on a Mooney plastometer using a large rotor at 4 minutes and a temperature of 212° F. The Mooney viscosity of a polymer is, of course, greater than that of a composition containing said polymer and a softener or tackifier.

The characteristics of different types of rubber polymers, such as polybutadiene and gel-containing SBR rubber polymers, cannot always be properly determined directly on a Mooney viscometer; and, therefore, it is customary to evaluate different rubbers after mixing them with predetermined amounts of oil and carbon black. Since the readings obtained on the Mooney plastometer provide a good indication of the properties of standard gel-free SBR (butadiene-styrene) rubber polymers, such polymers provide a basis for comparison using the concept of "computed Mooney viscosity" which is explained, for example, in the aforementioned U.S. Pat. No. 2,964,083 and in the article appearing on pages 309 to 319 of India Rubber World, Vol. 124, No. 3, June 1951. The "computed Mooney viscosity" of any rubber polymer may be considered as the equivalent of the actual (measured) Mooney viscosity of a comparable gel-free polymer.

Since 100 parts by weight of a 90-Mooney gel-free SBR rubber polymer mixed with 30 parts of hydrocarbon mineral oil, and 65 parts of HAF carbon black produces a rubber mixture with a compounded Mooney viscosity (ML–4) of approximately 60, any other rubber polymer, which when mixed with such oil, and carbon black in the same proportions produces a rubber mixture with the same compounded Mooney viscosity of 60, has a "computed Mooney viscosity" of approximately 90. In other words, the "computed Mooney viscosity" of any rubber is the actual Mooney viscosity of a standard gel-free polymer having equivalent compounding properties.

As pointed out in the aforementioned article in India Rubber World and in U.S. Pat. No. 2,964,083, sample compositions made for the purpose of determining the computed Mooney viscosity of a rubber polymer contain an amount of high abrasion furnace carbon black (Philblack 0) equal to one-half the combined weight of the polymer and oil (Sundex 53). A plot of the Mooney viscosity of a given crude polymer against parts of oil required to plasticize a polymer to a given compounded Mooney viscosity is linear, as explained in the aforesaid article, and provides the basis for determining the computed Mooney viscosity of any rubber. If a raw rubber polymer has a computed Mooney viscosity of 120, then a mixture consisting of 100 parts by weight of said polymer, 44 parts of oil, and 72 parts of HAF carbon black will have a compounded Mooney viscosity of about 60. If the raw rubber polymer has a computed Mooney viscosity of 140, then a mixture consisting of 100 parts by weight of said polymer, 54 parts of oil, and 77 parts of HAF carbon black will have a compounded Mooney viscosity of approximately 60. If a raw polymer has a computed Mooney viscosity of 160, then a mixture consisting of 100 parts by weight of said polymer, 64 parts of oil and 82 parts of HAF carbon black would have a compounded Mooney viscosity of about 60.

While the apparent raw Mooney viscosity of certain of the polybutadiene rubbers is in the order of 35 to 65, it is recognized that they must be compounded with large amounts of oil and carbon black and that the raw Mooney measurements do not accurately reflect the plasticity of the polymers. For example, the raw Mooney viscosity of the polybutadiene rubber "Diene-55" is 52. When 100 parts by weight of Diene-55 is compounded with 30 parts of Sundex 53 oil and 65 parts of the HAF carbon black "Philblack-0," the compounded Mooney, or the Mooney viscosity, of that compound is 70.

In contrast, the raw Mooney viscosity of the cold rubber SBR-1500 is also 52. However, when 100 parts by weight of SBR-1500 are compounded with 30 parts of Sundex 53 oil and 65 parts of the HAF carbon black Philblack 0, the compounded Mooney viscosity is 50. It is, therefore, manifest that Diene-55 polybutadiene rubber requires much more oil and is a tougher rubber than is SBR-1500 rubber, even though the raw Mooney viscosity measurements are of the same order. It is for such reasons that, in the present specification and claims, the phrase "computed Mooney viscosity" is employed to characterize the polymer or polymers used.

The invention is best illustrated by the following examples, wherein the percentages given are in parts by weight. It is to be understood, however, that the examples are given for purposes of illustration only and are not to be construed as limiting the present invention.

Example I

Run A.—A tread cement composition is prepared using a gel-free butadiene-styrene copolymer polymerized at 5.0° C. and containing 72 weight percent butadiene and 28 weight percent styrene. The copolymer is found to have a computed Mooney viscosity of 130 (ML–4 at 212° F.), the following ultimate formulation being used:

TREAD CEMENT FORMULATION

| | Parts by weight |
|---|---|
| SBR copolymer (cold rubber) | 100 |
| ISAF carbon black [1] | 60 |
| Acetylene - para - tertiarybutyl phenol resin (Koresin) | 74 |
| Zinc oxide | 5.0 |
| Phenyl-beta-naphthylamine (antioxidant) | 1.0 |
| Philrich 5 (oil) | 8.5 |
| N-cyclohexyl-2-benzothiazole sulfenamide (accelerator) | 1.2 |
| Diphenylguanidine (accelerator) | 0.3 |
| Sulfur | 2.2 |
| Total | 252.2 |

[1] This carbon black has a surface area of 125 square meters per gram.

100 parts by weight of this aforedescribed high-Mooney SBR cold rubber polymer is introduced into a Banbury with 34 parts of the resin and is masticated at 275° F. to melt the resin and thereby disperse it in the rubber. After a 12 hour rest period, the 60 parts of ISAF carbon black are added to the rubber stock in the Banbury and thoroughly dispersed by mastication at 325° F. together with the zinc oxide, the oil, and the antioxidant. The rubber stock then is allowed to cool to room temperature, with subsequent addition after another 12 hour rest period of the curing agents including sulfur and accelerators. The compounded rubber stock is worked in the Banbury until the temperature rises from room temperature to 220° F. which is approximately 50° below the incipient vulcanization temperature of the rubber.

The rubber composition thus formed is dissolved in gasoline-type rubbermaker's solvent (which is also a solvent for the resin), the 212.2 parts of the rubber composition being added to 1000 parts of the solvent. The balance of 40 parts by weight of the resin is then dissolved in 194.1 parts of the same solvent and is added to the cement solution to form a total composition of 1446.3 parts by weight. The resulting tread cement composition is used in building a tire as more fully described hereinafter.

A tire is made by the flat-band process using an extruded tire tread of a composition made from a butadiene-styrene copolymer having a computed Mooney viscosity (ML–4) of 125 wherein 100 parts by weight of the copolymer is enriched with 40 parts of the hydrocarbon plasticizer Philrich 5. The bias-cut tire carcass fabric skim coated with the same cold rubber SBR 125 Mooney copolymer, is applied to a cylindrical tire building drum to form a two ply carcass on the drum. The above tread cement solution is then applied to the bias cut ends of the extruded tire tread as well as to the bottom of the tread stock, the solvent then being allowed to evaporate. After drying at room temperature, the coated tread stock is applied to the carcass on the tire building drum and the ends of the stock adhered to form a tread splice. The improved cement of the invention forms an adhesive layer at the tread splice and another layer joining the tread and carcass portions of the tire.

The uncured tire containing the uncured cement is then removed from the building drum and is placed in a "Bag-o-matic" press, where the tire is expanded by a curing bag from a generally cylindrical form to toroidal shape and is cured by heating at 310° F. for 30 minutes. The adhesive layers are found to hold the fabricated rubber portions of the tire firmly together during this extreme expansion and vulcanization of the tire.

This tire, made according to the teachings of the present invention, exhibits a uniform tread splice area, has a tread splice tensile strength almost equal to that of the tread stock and gives a tread wear life, when road tested at 75 miles per hour, of 46,000 miles.

Run B.—The same general procedure as in Example I, Run A is repeated except that an SBR polymer (72% butadiene-28% styrene) having a Mooney viscosity of only 80 is employed. A 35% drop in uncured tensile strength at the tread splice area is noted. An opening in the tread splice is observed after 8,500 miles of road testing at 75 m.p.h.

Run C.—The same general procedure as in Run A is repeated except that HAF carbon black having a surface area of 75 square meters per gram is substituted for the ISAF carbon black. The result is that the tread splice, during expansion, becomes deformed but does not completely separate. Partial splice separation is noted after 18,000 miles of road testing.

Run D.—The same general procedure as in Run A is repeated except that SRF carbon black having a surface area of 17.5 square meters per gram is substituted for the ISAF carbon black. The result is that the tread splice becomes badly deformed and partially separated during expansion. Complete separation occurs after 19,500 miles.

Run E.—The same general procedure as in Eaxmple I, Run A is repeated substituting the resin 2,6-dimethylol-4-octyl phenol-formaldehyde (i.e., Amberol S.T.–137X) for the acetylene para-tertiarybutyl phenol resin. The result is that the tread splice separates when the uncured tire is expanded from cylindrical form to toroidal shape. Road testing of this tire is impossible.

Example II

Run A.—The same butadiene-styrene rubbery copolymer used in Example I is employed to make a tread cement composition utilizing the following ultimate formulation:

TREAD CEMENT FORMULATION

| | Parts by weight |
|---|---|
| SBR copolymer (cold rubber) | 75 |
| Polybutadiene (computed Mooney ML–4=85)[1] | 25 |
| ISAF carbon black | 60 |
| Acetylene-para-tertiarybutyl phenol resin (Koresin) | 74 |
| Zinc oxide | 5.0 |
| Diphenylamine-acetone reaction product (BLE antioxidant) | 1.0 |
| Philrich 5 (oil) | 8.5 |
| N-cyclohexyl-2-benzothiazone sulfenamide (accelerator) | 1.2 |
| Diphenylguanidine (accelerator) | 0.3 |
| Sulfur | 2.2 |
| Total | 252.2 |

[1] The polybutadiene contains 95% cis-1,4-polybutadiene and is produced by solution polymerization using the Zielger catalyst consisting of triethyl aluminum and titanium tetrachloride.

100 parts by weight of the high-Mooney SBR cold rubber polymer is mixed in a Banbury at 275° F. with 34 parts by weight of the resin. Then, the 60 parts by weight of ISAF carbon black are added to the Banbury and thoroughly dispersed by mastication at 325° F. with the subsequent addition at the same temperature of 5 parts zinc oxide and 8.5 parts oil. The compounded stock is then cooled to below 150° F., with the addition of the antioxidant, as well as the accelerators, the sulfur, and then mixed until the temperature rises to 230° F., i.e., approximately 40° below incipient vulcanization temperature.

The 40 remaining parts of the resin next are added dissolve in 446.3 parts of rubbermaker's solvent, with 1,000 parts of solvent being added to the cement such that there is a total solvent content of 1446.3 parts per 100 parts by weight of total rubber hydrocarbons. The procedure used to build the tire containing an oil-enriched cold rubber tread is essentially the same as in Example I and the adhesive layers are found to hold together as the tire is expanded from substantially cylindrical form to toroidal shape. The tire is vulcanized at a temperature of 287° F. for 30 minutes.

When road tested at 75 miles per hour, the tire exhibits a uniform tread splice area and had excellent tread splice tensile strength and when road tested at 75 miles per hour gives tread wear of 53,000 miles.

In Run B, the high Mooney rubber is replaced with an SBR copolymer having a Mooney viscosity of 70 with the formulation remaining otherwise the same. In Runs C and D the ISAF carbon black of Run A is replaced with HAF and SRF carbon black respectively and in Run E, the Koresin is replaced by modified rosin Pentalyn X (Pentaerythritol ester of rosin containing 85% abietic acid) and in all instances, the splices exhibit the same deficiencies observed in the corresponding Runs B, C, D and E of Example I. In road testing, the tires of Runs B, C and D developed tread splicer problems long before they reach the mileage of the tire Run A of Example II.

Example III

Further tests were run on a cement formulation identical to that used in Example I but with inclusion of 1.5 parts of pine oil.

Run A.—The sulfur and accelerators are omitted from the composition. The tire is expanded and cured for 30 minutes at 310° F. with no splice deformation. The tire exhibits a tread wear life of 41,000 miles and has a tread strength nearly equal to that of the tread stock.

Run B.—The same procedure as outlined in Example III, Run A is followed except that the tire is vulcanized at 287° F. for 70 minutes. The tire exhibited a tread life of 40,000.

Thus, it can be seen from Runs A and B that the omission of the curatives and charging of the curing conditions has only a slight effect upon the tire made according to the teachings of the present invention.

Run C.—A tire made in accordance with the teaching of Example III, Run A, but with the use of no polybutadiene with the SBR gave nearly identical results with the tire in Run A.

This shows that the inclusion of a minor proportion of polybutadiene rubber is optional. However, when practicing the present invention, it is generally preferred to include a minor proportion of the polybutadiene rubber principally to lower heat build-up, i.e. heat generation.

In the above example, the SBR rubber copolymer used in the cement may be replaced with an SBR polymer corresponding to that of an SBR–1712 masterbatch but free of oil. SBR–1712, a well-known oil-rubber masterbatch (cold rubber), is a mixture of 100 parts by weight of a copolymer of butadiene and styrene and 37.5 parts of a highly aromatic processing oil (i.e., Philrich 5). The polymer is manufactured by emulsion polymerization at about 5° C., using mixed soaps of rosin and fatty acids, a sugar-free iron activated system, and a carbamate short-stop. SBR–1712 may be coagulated by the salt-acid procedure, the butadiene-styrene copolymer containing about 22.5 to 24.5 percent of styrene.

Example IV

The same general procedure as in Example I, Run A is repeated except that 34 parts by weight of the total resin first are dissolved in the xylene mixture "xylol" to form a 20% solution. This solution then is blended with the 8.5 parts by weight of Philrich 5 plasticizing oil and 73 parts by weight of water together with 0.35 part oleic acid and 0.35 part ammonium hydroxide. The resulting admixture is formed into a stable emulsion by agitation followed by 2 passes through a Charlotte-type colloid mill. This resin-emulsion then is blended with the SBR latex and coagulated by standard salt-acid technique to obtain a crumb which is dried, sheeted out, with the 100 parts by weight of SBR copolymer (ML–4) 130, the 34 parts of acetylene para-tertiarybutyl phenol resin, the 8.5 parts of oil being masticated at 275° F. with 40 more parts of the resin being added dissolved in a solvent as in Example I, Run A. The indicated amounts of ISAF carbon black, zinc oxide, and phenyl-beta-naphthylamine, sans additional oil, are masticated at 325° F. and the balance of Run A repeated exactly, with the following results: The resulting adhesive layers are found to hold the fabricated rubber portions of the tire together at the cement-coated tread splice area as the tire is expanded from cylindrical shape to toroidal form. Upon vulcanizing, at 310° F. for 30 minutes, the tread splice area is found to be uniform, the tensile strength being almost equal to that of the stock and the tread wear life of the resulting tire is 47,200 miles with no tread splice opening occurring during the entire road testing at 75 miles per hour.

Experiment I (Comparative)

Run A.—An oil-extended rubber tread compound is prepared from a substantially gel-free, butadiene-styrene copolymer polymerized at 41° F. and containing 72 percent by weight of butadiene and 28 percent by weight of styrene and having a Mooney viscosity (ML–4) of 150 using the following recipe:

OIL-EXTENDED SBR TREAD RECIPE

| | Parts |
|---|---|
| 150 ML–4 polymer (SBR cold rubber) | 100 |
| Petroleum softener (Sundex 53) | 50 |
| HAF carbon black (Philblack 0) | 75 |
| Zinc oxide | 5 |
| Stearic acid | 2 |
| Sulfur | 2.2 |
| Santocure (N-cyclohexyl-2-benzothiazole disulfenamide) | 1.2 |
| DPG (diphenyl guanidine) | 0.2 |

The above materials are compounded and mixed under the usual two-pass Banbury mixing procedure and extruded into suitable tread form.

A tread cement compound is prepared from the same copolymer using the following recipe:

SBR TREAD ADHESIVE RECIPE FOR TREAD CEMENT

| | Parts |
|---|---|
| 150 ML–4 polyymer (SBR cold rubber) | 100 |
| Koresin (acetylene-para-tertiarybutyl phenol resin) | 40 |
| Petroleum softener (Sundex 53) oil | 10 |
| HAF carbon black (Philblack); 74.2 sq. meters per gram) | 60 |
| Zinc oxide | 5 |
| Sulfur | 2.2 |
| BLE (diphenylamine-acetone reaction product) | 1.0 |
| Santocure (N-cyclohexyl - 2 - benzothiazole sulfenamide) | 1.2 |
| DPG (diphenyl guanidine) | 0.3 |

One-hundred parts of the above tread cement compound are dispersed, after the usual appropriate mixing on a mill, in 900 parts of solvent petroleum naphtha to form a tread cement.

The same copolymer is also used to prepare a carcass compound using the following recipe:

OIL-EXTENDED SBR CARCASS RECIPE

| | Parts |
|---|---|
| 150 ML–4 polymer (GR–S cold rubber) | 100 |
| Petroleum softener (Sundex 53) oil | 50 |
| FEF carbon black (Philblack A) | 65 |
| Zinc oxide | 5 |
| Stearic acid | 2 |
| Sulfur | 2.2 |
| Santocure (N-cyclohexyl - 2 - benzothiazole disulfenamide) | 1.2 |
| DPG (diphenyl guanidine) | 0.2 |

After the cement and the compounded tread and carcass stocks have been prepared, they are used in the conventional manner to build a 4 ply tire, the carcass compound being calendered on to a tire cord fabric (which has previously been treated or dipped as in Mighten Pat. No. 2,561,215 with a compounded vinyl pyridine-butadiene copolymer latex) to form an all-synthetic rubber tire with the tread compound being formed in the regular cylindrical shape and then expanded to toroidal form. The ply fabric is coated on both sides with the above cement solution by suitable means and is cut on the bias for use in forming tire plies. Four of these plies are used in the customary way to form a tire carcass on the drum of a tire-building machine. The tread cement is then applied at the tread splice and to the underside of the tread stock which has been extruded. After drying, the coated tread is applied to the carcass. The dried cement or adhesive forms a layer at the tread splice area and between the tread and the carcass portions of the tire. The tire is then shaped and vulcanized in the usual manner, (e.g. at 287° F. for 60 minutes) in a suitable tire mold.

A tire produced in this way is very durable and will last for a long period of time without separation of the tread from the carcass. Such a tire having the oil-extended tread adhered at the splice and to the carcass as above will last 30,000 miles under severe conditions of use at 75 miles per hour without failure.

The same general procedure as in comparative Experiment I, Run A was repeated except that a 2 ply tire, similar to those used in Examples I, II, III and IV, was built and tested. The resultant tire exhibited tread splice separation within 15,000 under high speed test conditions. Thus, although excellent adhesion results when this cement is used on a 4 ply tire, the tire performance when it is used on 2 ply tires is only adequate.

In the appended claims, the terms "diene rubbery polymer" and "rubbery diene polymer" are used in a generic sense to include non-oil-resistant rubbery synthetic hydrocarbon polymers such as hydrocarbon copolymers (preferably emulsion copolymers) of a major proportion of one or more multiolefins such as butadiene, isoprene and dimethyl butadiene with a minor proportion of copolymerizable monoolefinic hydrocarbons such as one or more of those aforementioned.

Resort may be had to modifications and variations without departing from the spirit of the invention or the scope of the appended claims.

I claim:
1. A tread adhesive composition for synthetic rubber tires comprising:
 (a) 100 parts of weight of a synthetic rubber hydrocarbon composed of the polymerization product of between about 60 and about 85% of a conjugated diolefin containing about 4 to 6 carbon atoms and between about 40 and about 15% of a monovinyl aromatic hydrocarbon, said polymerization product having a computed Mooney (ML-4 at 212° F.) viscosity of between about 120 and 180;
 (b) up to about 15 parts by weight of a hydrogen plasticizer oil;
 (c) about 30 to about 120 parts of an abrasion furnace carbon black having an average surface area of about 100 to 170 square meters per gram and a pH of between about 5 and about 10; and
 (d) between about 65 and 125 parts of a resin, substantially all of which comprises the condensation product of an aliphatic unsaturated hydrocarbon containing a triple bond and a phenol substituted in the para position with a hydrocarbon group having from 3 to 6 carbon atoms.

References Cited

UNITED STATES PATENTS 3,294,720  12/1966  Beber et al. _____ 260—41.5
3,342,238  9/1967   Weinstock et al.

MORRIS LIEBMAN, Primary Examiner

H. H. FLETCHER, Assistant Examiner

U.S. Cl. X.R.

106—307; 152—330; 156—128; 260—41.5, 879

PO-1050
(5/69)

UNITED STATES PATENT OFFICE
CERTIFICATE OF CORRECTION

Patent No. 3,514,423      Dated May 26, 1970

Inventor(s) Emmett B. Reinbold

It is certified that error appears in the above-identified patent and that said Letters Patent are hereby corrected as shown below:

Column 1, line 32, "No. 18, 1964" should be --- November 18, 1964 ---. Column 3, line 64, "CRF" should be --- SRF ---; line 68, "haping" should be --- having ---. Column 4, line 3, " (conductive channel- " should be --- (conductive channel) ---; line 5, "390 squire" should be --- 390 square ---; line 38, "in solution from" should be --- in solution form ---. Column 5, line 10, "1.5 atmospheres" should be --- 1.5 atmosphere ---. Column 10, line 23, "benzothiazone" should be --- benzothiazole ---; lines 44-45, "dissolve" should be --- dissolved ---. Column 12, line 21, "polyymer" should be --- polymer ---.

Claim 1, Column 14, line 6, "hydrogen" should be --- hydrocarbon ---.

SIGNED AND
SEALED
OCT 20 1970

(SEAL)
Attest:

Edward M. Fletcher, Jr.
Attesting Officer

WILLIAM E. SCHUYLER, JR.
Commissioner of Patents